United States Patent [19]
Matsuura

[11] Patent Number: 5,539,781
[45] Date of Patent: Jul. 23, 1996

[54] COMBINING DIVERSITY APPARATUS WITH SQUELCH FUNCTION

[75] Inventor: Toru Matsuura, Tokyo, Japan

[73] Assignee: NEC Corporation, Japan

[21] Appl. No.: 351,021

[22] Filed: Dec. 7, 1994

[30] Foreign Application Priority Data

Dec. 14, 1993 [JP] Japan .................. 5-313805

[51] Int. Cl.⁶ .............. H04B 7/02; H04B 1/10; H04L 1/02
[52] U.S. Cl. .......... 375/347; 375/351; 455/137; 455/219
[58] Field of Search ............... 375/267, 285, 375/345, 347, 351, 219; 455/137, 138, 139, 234.1, 218, 219

[56] References Cited

U.S. PATENT DOCUMENTS

| | | | |
|---|---|---|---|
| 3,593,147 | 7/1971 | Gurak et al. | 455/139 |
| 4,619,002 | 10/1986 | Thro | 375/345 |

FOREIGN PATENT DOCUMENTS

| | | |
|---|---|---|
| 58-197926 | 11/1983 | Japan . |
| 3-58630 | 3/1991 | Japan . |
| 3-116376 | 5/1991 | Japan . |
| 4-345229 | 12/1992 | Japan . |

*Primary Examiner*—Stephen Chin
*Assistant Examiner*—Tesfaldet Bocure
*Attorney, Agent, or Firm*—Laff, Whitesel, Conte & Saret

[57] ABSTRACT

In a combining diversity apparatus for a digital multi-valued modulation RF signal, at least first and second receiving antenna units having a space diversity relationship, first and second frequency conversion units for converting the RF signal into first and second IF signals, a combining unit for phasing-combining the first IF signal with the second IF signal, and determination units for determining whether or not the first and second IF signals are interference signals, are provided. When the first or second IF signal is an interference signal, the first or second IF signal is shut off or attenuated by a first switching unit or a second switching unit.

20 Claims, 12 Drawing Sheets

| A | B | S3 |
|---|---|----|
| + | 0 | +V |
| 0 | + | −V |
| 0 | 0 | 0 |

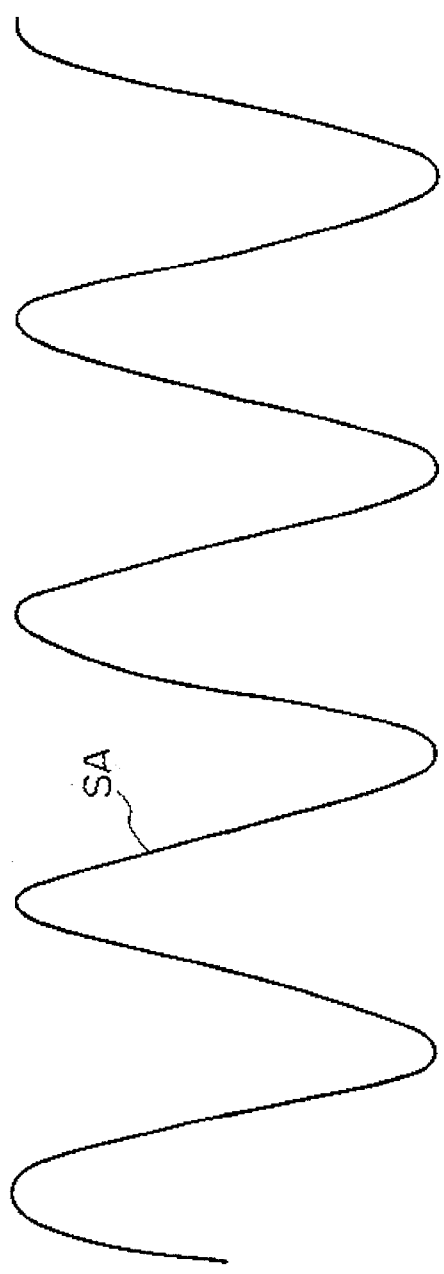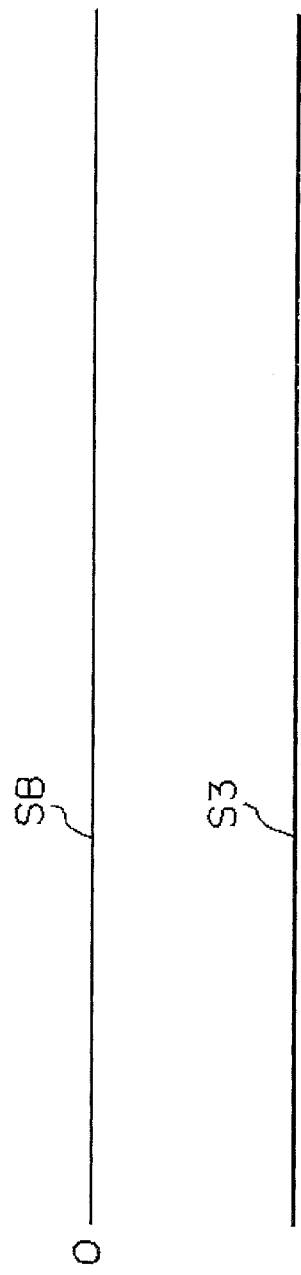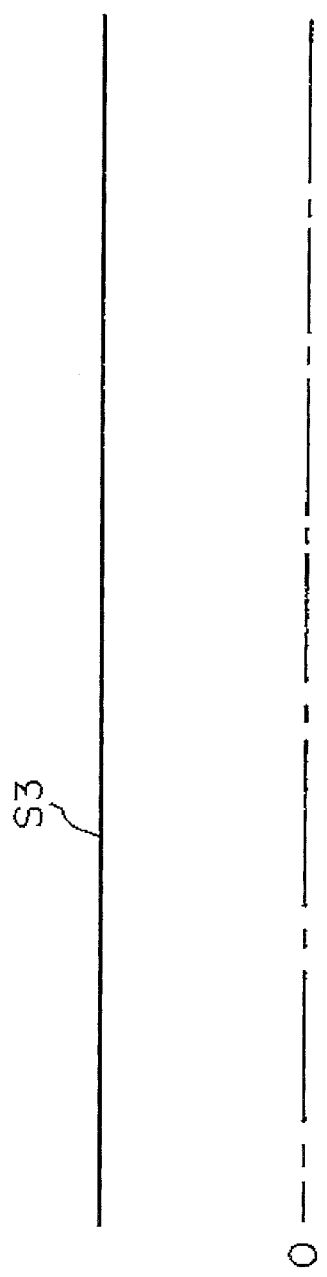
Fig. 4A PRIOR ART
Fig. 4B PRIOR ART
Fig. 4C PRIOR ART

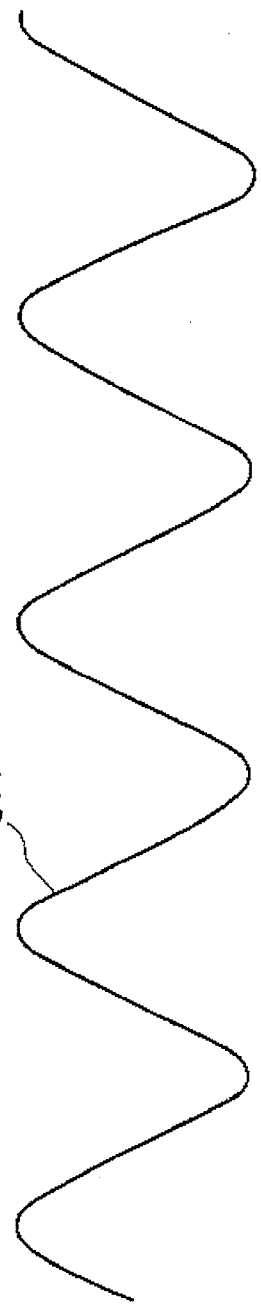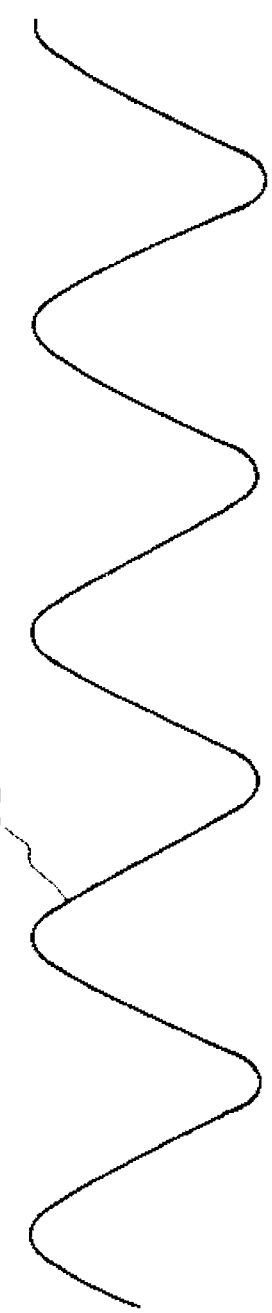
Fig. 6A PRIOR ART
Fig. 6B PRIOR ART
Fig. 6C PRIOR ART

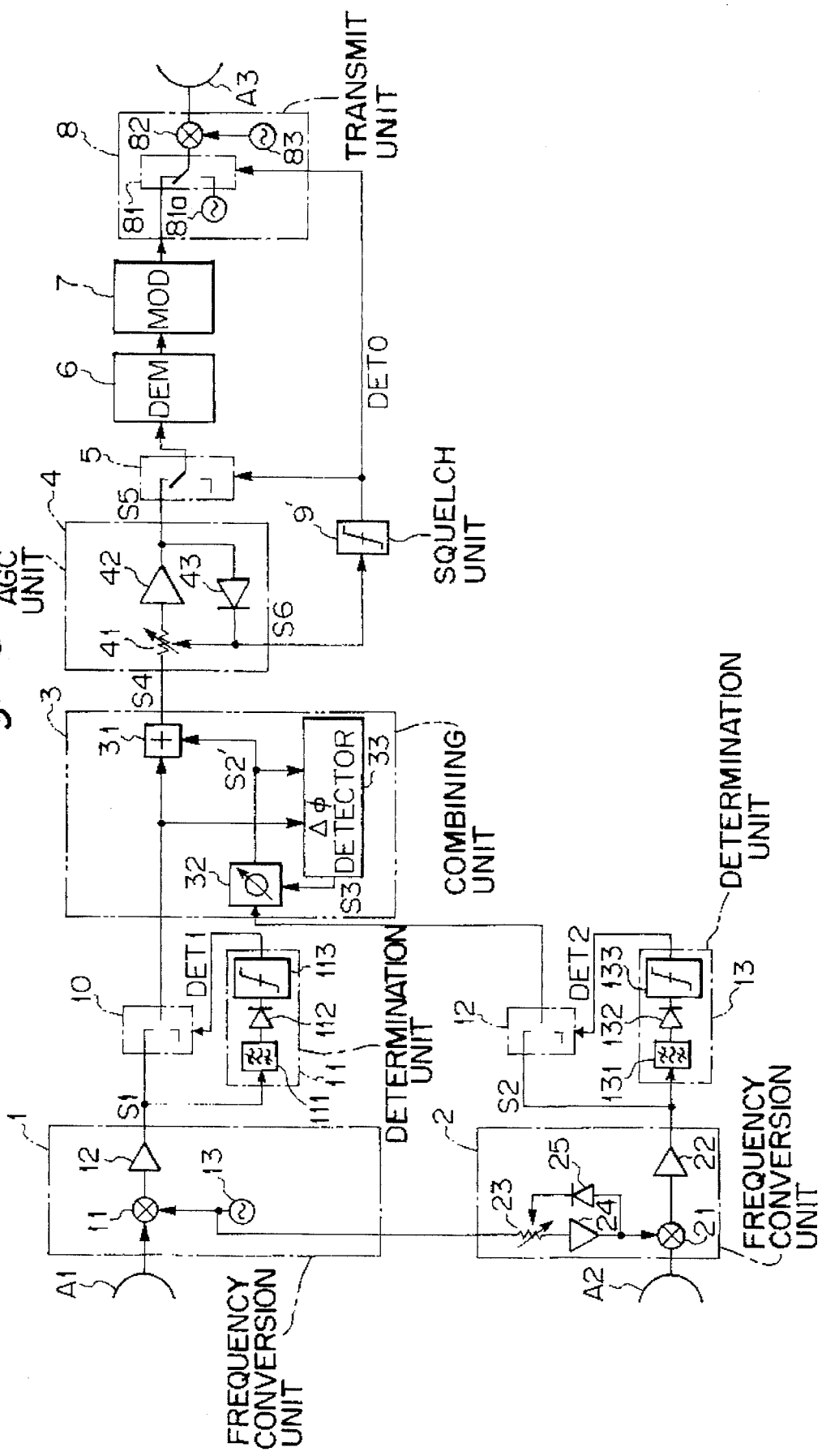

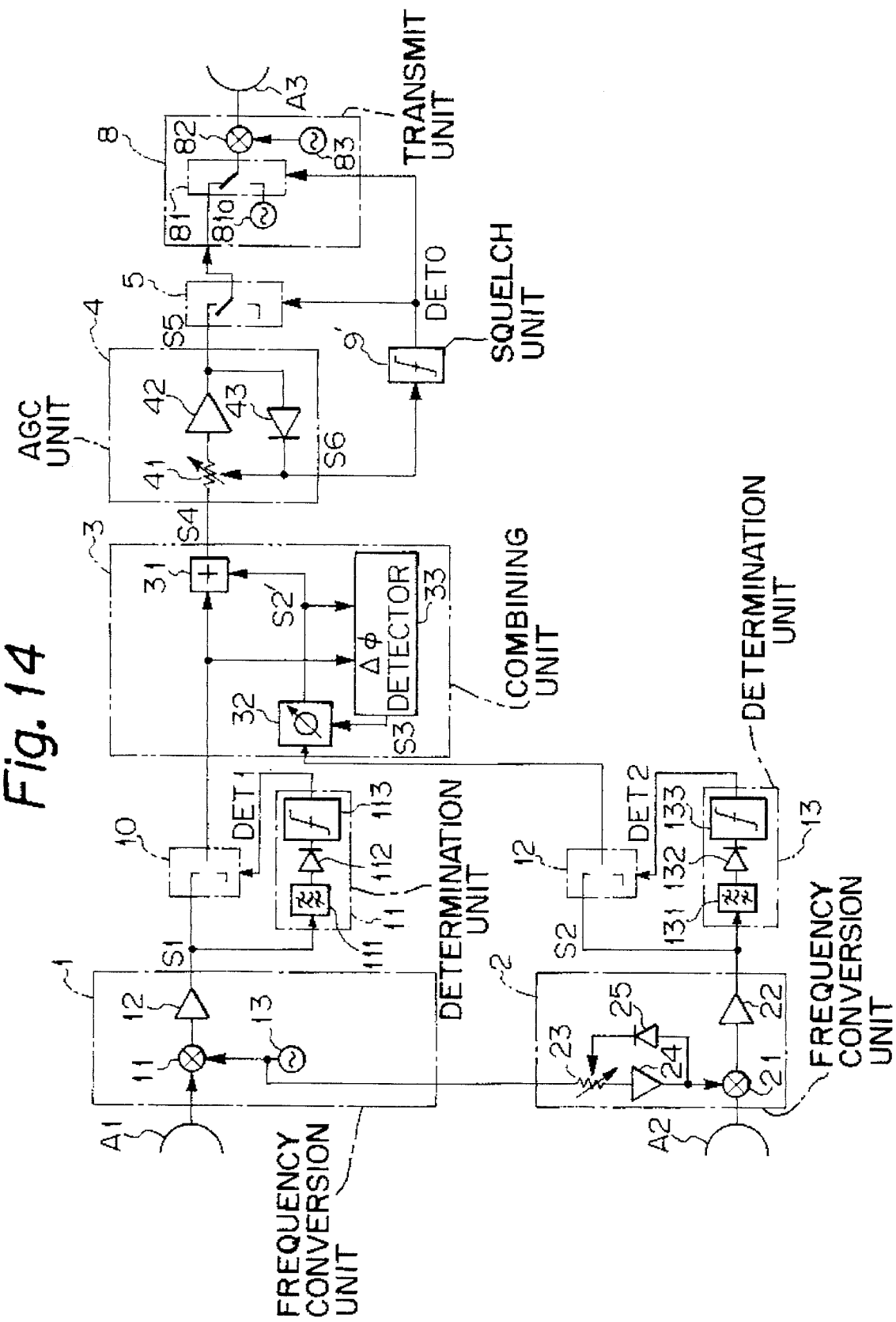

COMBINING DIVERSITY APPARATUS WITH SQUELCH FUNCTION

BACKGROUND OF THE INVENTION

1. Field of the Invention

The present invention relates to a combining diversity apparatus with a squelch function in a digital multi-valued modulation signal receiver and transmitter circuit.

2. Description of the Related Art

In a digital communication system, diversity technology has been used to reduce a rate of transmission errors caused by fading. For example, two antenna units for the same modulation signal are located separately at different sites. This is called space diversity. Then, the two signals received by the two antenna units are combined by an equal-gain combining diversity method or the like. The equal-gain combining diversity method or the like is carried out by hardware or software.

Also, in a digital communication system, a squelch function is introduced into the modulation signal receiver and transmitter circuit, thereby preventing it from erroneously operating to generate a spurious signal therefrom. For example, when an undesired signal or an interference signal is received, such a signal is detected in accordance with a clock signal component included in a received signal, to carry out a squelch operation (see JP-A-HEI4-345229). Also, such a signal is detected in an identification signal component included in the received signal, to carry out a squelch operation (see JP-A-HEI3-116376). Further, when a reception level of a normal signal is extremely reduced, the reduction is detected to carry out a squelch operation (see JP-A-HEI3-58630).

A prior art combining diversity apparatus with a squelch function is constructed by at least first and second receiving antenna units having a space diversity relationship, first and second frequency conversion units for converting the modulation RF signal into first and second IF signals, a combining unit for phasing-combining the first IF signal with the second IF signal, and a squelch unit connected to the combining unit. That is, when an output signal level of the combining unit is deviated from a threshold value, for example, when this output signal level becomes higher than the threshold value, a squelch operation is carried out by the squelch unit, to avoid generation of a spurious signal. This will be explained later in detail.

In the above-described prior art combining diversity apparatus, however, even when undesired waves (interference waves) are introduced into a part of the receiving antenna units, the squelch unit may carry out a squelch operation, so that a combining operation is not carried out normally.

SUMMARY OF THE INVENTION

It is an object of the present invention to provide a combining diversity apparatus with a squelch function which can carry out a normal combining operation, even when undesired waves (interference waves) are introduced into a part of the receiving antenna units.

According to the present invention, in a combining diversity apparatus for a digital multi-valued modulation RF signal, at least first and second receiving antenna units having a space diversity relationship, first and second frequency conversion units for converting the RF signal into first and second IF signals, a combining unit for phasing-combining the first IF signal with the second IF signal, and determination units for determining whether or not the first and second IF signals are interference signals are provided. When the first or second IF signal is an interference signal, the first or second IF signal is shut off or attenuated by a first switching unit or a second switching unit. That is, if only one of the first and second IF signals includes undesired waves (interference waves) squelch operation, so that a combining operation is carried out normally.

BRIEF DESCRIPTION OF THE DRAWINGS

The present invention will be more clearly understood from the description as set forth below, with reference to the accompanying drawings, wherein:

FIGS. 4A, 4B and 4C are timing diagrams showing the operation of the phase difference detector of FIG. 2;

FIGS. 6A, 6B and 6C are timing diagrams showing the operation of the phase difference detector of FIG. 2;

FIG. 8 is a circuit diagram illustrating a first embodiment of the combining diversity apparatus with a squelch function;

FIG. 14 is a circuit diagram illustrating a fourth embodiment of the combining diversity apparatus with a squelch function.

DESCRIPTION OF THE PREFERRED EMBODIMENTS

Before the description of the preferred embodiments, a prior art combining apparatus with a squelch function will be explained with reference to FIGS. 1, 2, 3, 4A, 4B, 4C, 5A, 5B, 5C, 6A, 6B, 6C, 7A and 7B.

Figure 1:
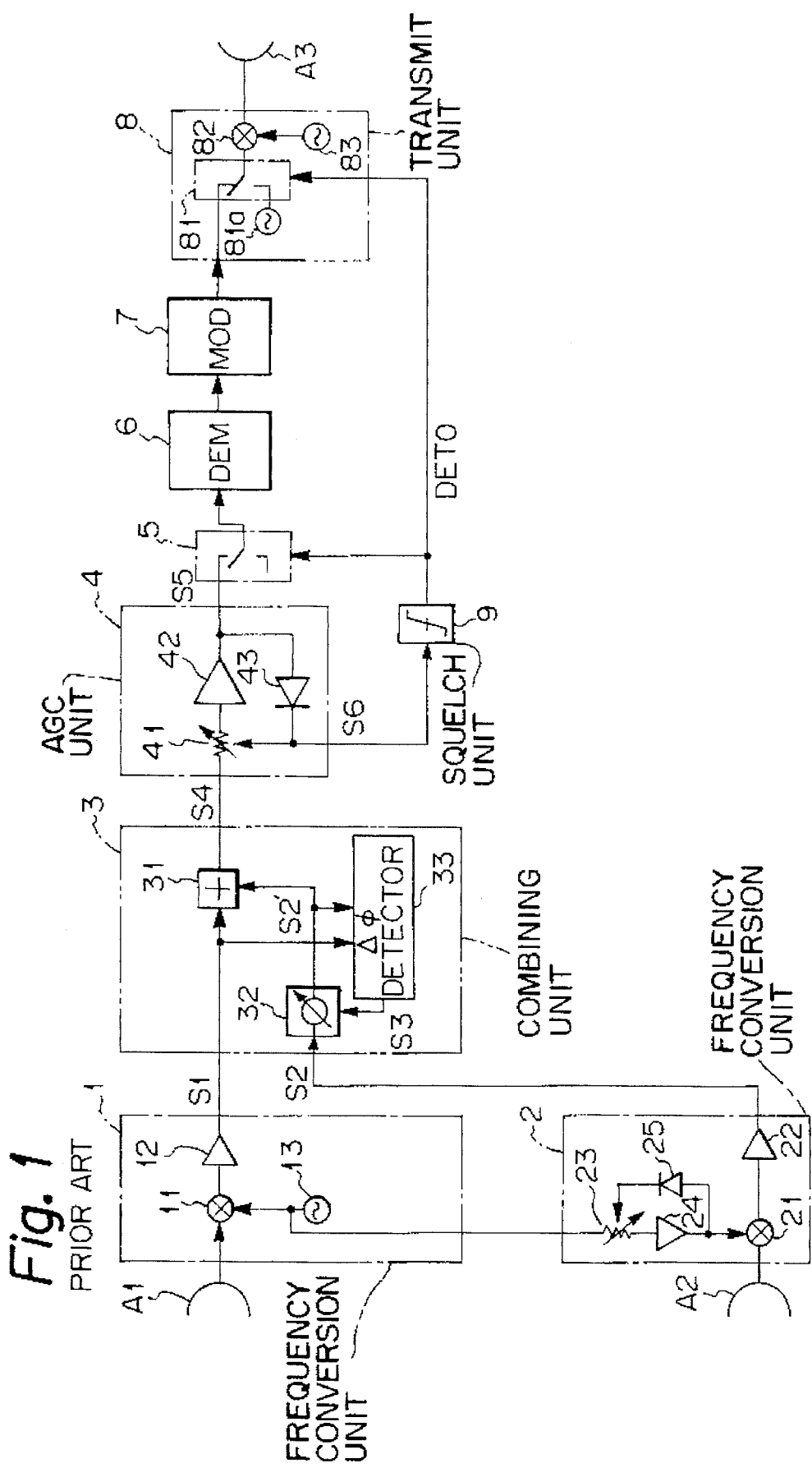
FIG. 1 is a circuit diagram illustrating a prior art combining diversity apparatus with a squelch function.

In FIG. 1, which is a circuit diagram of a prior art combining apparatus, two receiving antenna units A1 and A2 for the same modulation radio frequency (RF) signal are located at different sites. That is, a space diversity is formed. The receiving antenna units A1 and A2 are connected to frequency conversion units 1 and 2 for converting the RF signal into intermediate frequency (IF) signals S1 and S2, respectively.

The frequency conversion unit 1 includes a multiplier 11 for multiplying the RF signal by a signal of an RF oscillator 13 and an amplifier 12 for amplifying an output signal of the multiplier 11.

The frequency conversion unit 2 includes a multiplier 21 and an amplifier 22 corresponding to the multiplier 11 and the amplifier 12 of the frequency conversion unit 1, and also includes an automatic gain control (AGC) circuit formed by a variable attenuator 23, an amplifier 24 and a level detector 25 instead of the RF oscillator 13 of the frequency conversion unit 1. This AGC circuit compensates for an attenuation due to the distance between the frequency conversion units 1 and 2.

Thus, the frequency conversion units 1 and 2 have substantially the same configuration. Output signals of the amplifiers 12 and 22, i.e., the IF signals S1 and S2 are supplied to a combining unit 3.

In the combining unit 3, the IF signal S1 is directly supplied to an adder 31, while the IF signal S2 is supplied via an endless phase shifter 32 to the adder 31. That is, the IF signal S2 is converted by the endless phase shifter 32 into an IF signal S2', so that the phase of the IF signal S2' coincides with that of the IF signal S1. For this, a phase difference detector 33 is provided. The phase difference detector 33 receives both of the IF signals S1 and S2' from the frequency conversion unit 1 and the endless phase shifter 31 to generate a control signal S3 for controlling the endless phase shifter 32. This control signal S3 is made a positive value when the IF signal S1 is advanced in phase as compared with the IF signal S2', while the control signal S3 is made a negative value when the IF signal S1 is retarded in phase as compared with the IF signal S2'. Also, the control signal S3 is zero when the difference in phase between the IF signals S1 and S2' is zero. As a result, until the control signal S3 of the phase difference detector 33 becomes zero, the endless phase shifter 32 changes its shift phase amount. After the control signal S3 of the phase difference detector 33 becomes zero, the shift phase amount of the endless phase shifter 32 is fixed. The phase difference detector 33 will be explained later in detail.

An output signal S4 of the combining unit 3 is supplied to an AGC unit 4 which includes a variable attenuator 41, an amplifier 42, and a level detector 43. As a result, the level of an output signal S5 of the AGC unit 4 is close to a definite value regardless of the level of the output signal S4 of the combining unit 3. An output signal S5 of the AGC unit 4 is supplied via a switching unit 5 to a demodulator 6 and a modulator 7, and then to a transmitter unit 8 connected to a transmitter antenna A3. In this case, since the demodulator 6 and the modulator 7 are provided, the combining diversity apparatus of FIG. 1 serves as a regenerative repeater.

The switching unit 5 and the transmitter unit 8 are controlled by a squelch unit 9 which receives an AGC signal S6 from the AGC unit 4. The squelch unit 9 includes a comparator for comparing the output level of the AGC unit 4 with a threshold value to generate a determination signal DET0. That is, when interference waves are introduced into one of the receiving antenna units A1 and A2, the level of the output signal S4 of the combining unit 4 becomes higher, so that the level of the AGC signal S6 becomes lower. As a result, the squelch unit 9 makes its determination signal DET0 high to control the switching unit 5 and the transmitter unit 8. That is, the switching unit 5 is turned OFF, or the switching unit 5 is in an attenuation state. Simultaneously, the transmitter unit 8 generates a squelch signal.

In more detail, the transmitter unit 8 includes a switching circuit 81 controlled by the determination signal DET0, and a multiplexer 82 for multiplying an output signal of the switching circuit 81 by an output signal of all RF oscillator 83. When the determination signal DET0 is low, the switching circuit 81 selects an output of the modulator 7. On the other hand, when the determination signal DET0 is high, the switching circuit 81 selects an output of a squelch oscillator 81a, to carry out a squelch operation, thus generating the squelch signal.

Figures 2, 3:
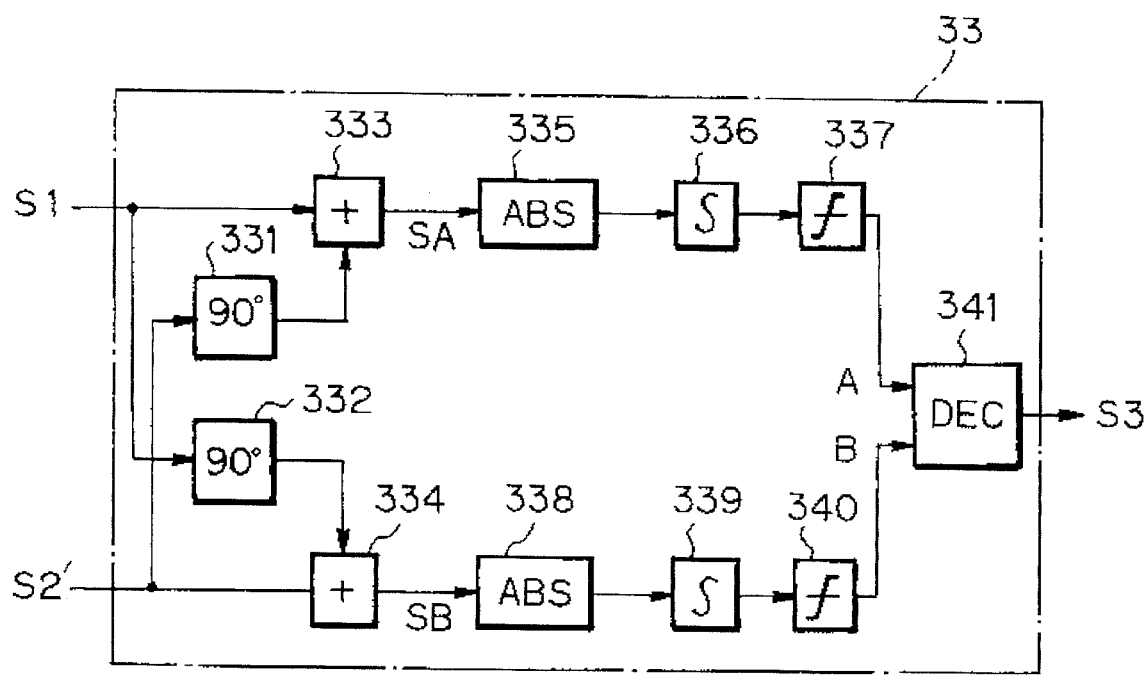
FIG. 2 is a detailed circuit diagram of the phase difference detector of FIG. 1.
FIG. 3 is a table diagram showing a relationship between the inputs and output of the decoder of FIG. 2.

In FIG. 2, which is a detailed circuit diagram of the phase difference detector 33 of FIG. 1, the phase difference detector 33 includes two 90° phase shifters 331 and 332 for shifting the IF signals S1 and S2' by 90°, an adder 333 for adding an output signal of the 90° phase shifter 331 to the IF signal S1, and an adder 334 for adding an output signal of the 90° phase shifter 332 to the IF signal S2'. The output signal SA of the adder 333 is supplied via an absolute value circuit 335 to an integrator 336. Also, an output of the integrator 336 is compared by a comparator 337 with a reference voltage. In this case, if the output of the integrator 336 is higher than the reference voltage, an output A of the comparator 337 is a positive value. Otherwise, the output A of the comparator 337 is zero. Similarly, an output of the integrator 339 is compared by a comparator 340 with the reference voltage. In this case, if the output of the integrator 339 is higher than the reference voltage, an output B of the comparator 339 is a positive value. Otherwise, the output B of the comparator 337 is zero.

The output A and B of the comparators 337 and 340 are supplied to a decoder 341 which generates the decoding signal S3 as shown in FIG. 3.

That is, if the IF signal S1 is advanced in phase as compared with the IF signal S2' by 90°, the signal SA of the adder 333 is shown in FIG. 4A while the signal SB of the adder 334 is zero as shown in FIG. 4B. Therefore, the outputs A and B of the comparators 337 and 340 are a positive value and zero, respectively, so that the decoding signal S3 of the decoder 341 becomes a positive value as shown in FIG. 4C.

Figures 5A, 5B, 5C:
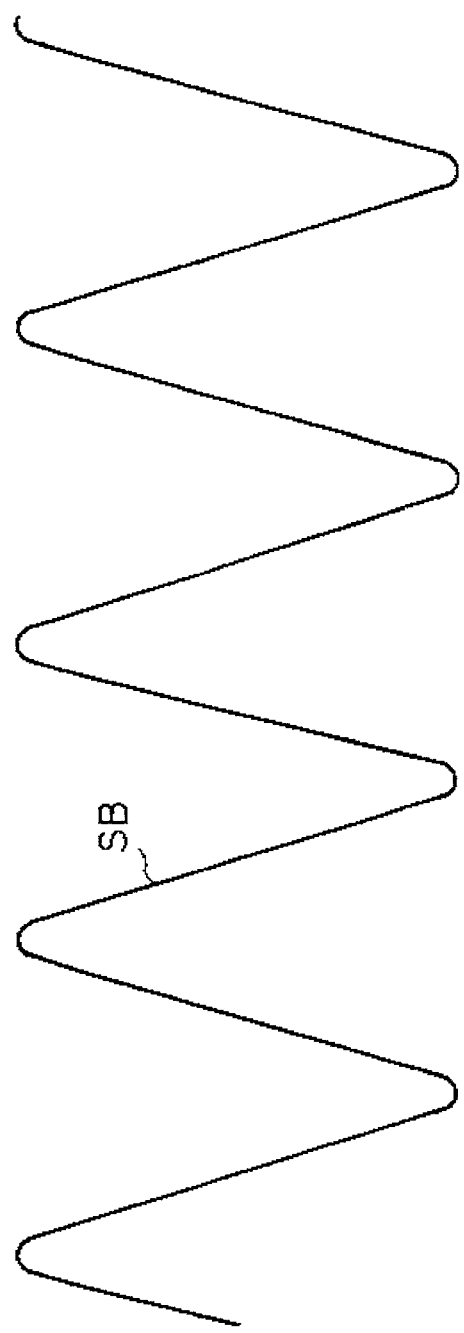
FIGS. 5A, 5B and 5C are timing diagrams showing the operation of the phase difference detector of FIG. 2.

Also, if the IF signal S1 is retarded in phase as compared with the IF signal S2' by 90°, the signal SA of the adder 333 is zero as in FIG. 5A while the signal SB of the adder 334 is shown in FIG. 5B. Therefore, the outputs A and B of the comparators 337 and 340 are zero and a positive value, respectively, so that the decoding signal S3 of the decoder 341 becomes a negative value as shown in FIG. 5C. Further, if the phase of the IF signal S1 coincides with that of the IF signal S2', the phase of the output signal SA of the adder 333 coincides with that of the output signal SB of the adder 334 as shown in FIGS. 6A and 6B. Therefore, the outputs A and B of the comparators 337 and 340 are both zero, so that the decoding signal S3 of the decoder 341 is zero as shown in FIG. 6C.

Thus, the output signal S3 of the phase difference detector 33 can be used for controlling the endless phase shifter 32.

Figure 7A:
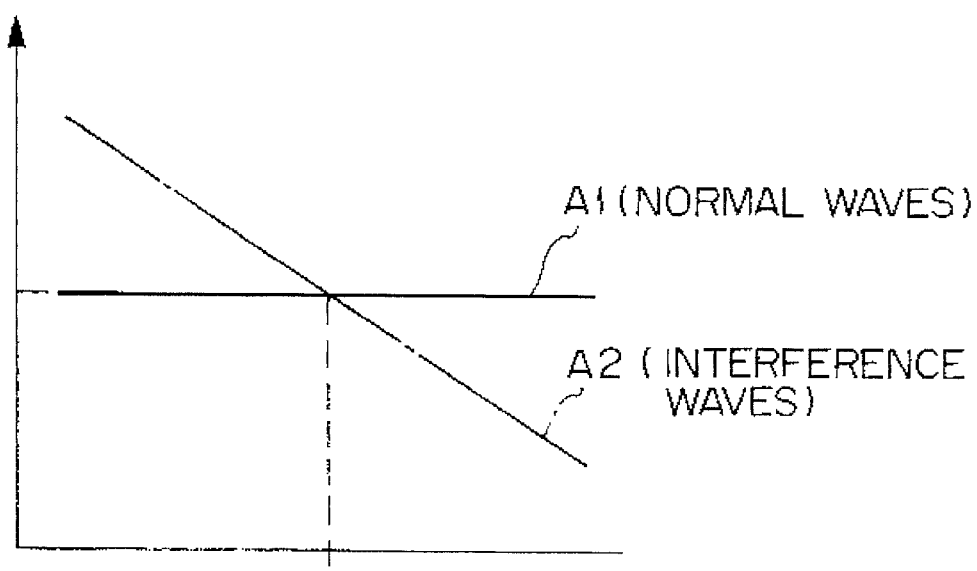
FIGS. 7A and 7B are diagrams showing the operation of the squelch unit of FIG. 1.
Figure 7B:
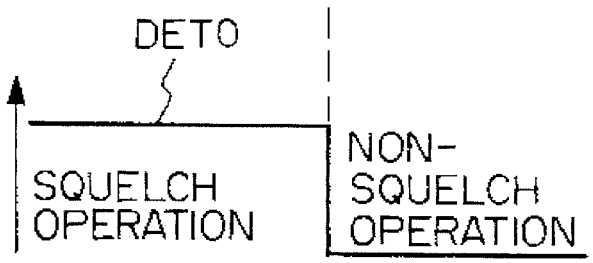

The operation of the combining apparatus of FIG. 1 is explained next with reference to FIGS. 7A and 7B. Assume that normal waves whose level is definite are introduced into the receiving antenna unit A1, and interference waves whose level is changed are introduced into the receiving antenna unit A2. In this case, when the level of the interference waves is small, the level of the output signal S4 of the combining unit 3 is dependent upon approximately only the level of the normal waves, so that the level of the AGC signal S6 of the AGC unit 4 is higher than the threshold value, thus making the determination signal DET0 low. As a result, a squelch operation is not carried out. Conversely, when the level of the interference waves is large, the level of the output signal S4 of the combining unit 3 is dependent upon approximately only the level of the interference waves, so that the level of the AGC signal S6 of the AGC unit 4 is lower than the threshold value, thus making the determination signal DET0 high. As a result, a squelch operation is carried out. That is, even when the level of normal waves introduced into the receiving antenna unit A1 is at a suitable level, a squelch operation is carried out to ignore the normal waves.

In FIG. 8, which illustrates a first embodiment of the present invention, a switching unit 10 is provided between the frequency conversion unit 1 and the combining unit 3, and a determination unit 11 is provided between the frequency conversion unit 1 and the switching unit 10. That is, the switching unit 10 is controlled by a determination signal DET1 of the determination unit 11. Similarly, a switching unit 12 is provided between the frequency conversion unit 2 and the combining unit 3, and a determination unit 13 is provided between the frequency conversion unit 2 and the switching unit 12. That is, the switching unit 12 is controlled by a determination signal DET2 of the determination unit 13.

The determination unit 11 (13) is constructed by a band pass filter 111 (131), a level detector 112 (132), and a comparator 113 (133) for comparing an output level of the level detector 112 (132) with a threshold value. In this case, the band of the band pass filter 111 (131) is a narrow band including a carrier frequency. That is, generally, the power of interference FM waves is concentrated on a narrow band centered at the carrier frequency, while the power of a multi-valued modulated waver (normal waves) is wider than such a narrow band. Therefore, if the band of the band pass filter 111 (131) is limited to such a narrow band, the output level of the level detector 112 (132) is smaller for the normal waves and larger for the interference waves. Therefore, when the output level of the level detector 112 (132) is higher than the threshold value, the comparator 113 (133) makes its determination signal DET1 (DET2) high to turn OFF the switching unit 10 (12) or put the switching unit 10 (12) in an attenuation state.

Figure 9A:
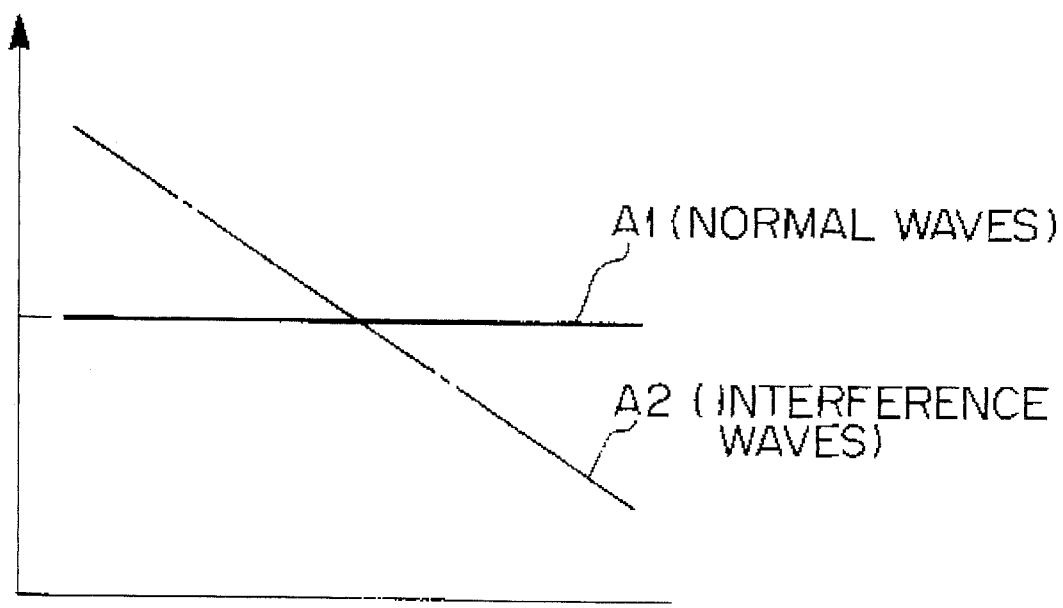
FIGS. 9A and 9B are diagrams showing the operation of the squelch unit of FIG. 8.
Figure 9B:

The operation of the combining apparatus of FIG. 8 is explained next with reference to FIGS. 9A and 9B. Again, assume that normal waves whose level is definite are introduced into the receiving antenna unit A1 and interference waves whose level is changed are introduced into the receiving antenna unit A2. In this case, when the level of the interference waves is small, the level of the output signal S4 of the combining unit 3 is dependent upon approximately only the level of the normal waves, so that the level of the AGC control signal S6 of the AGC unit 4 is higher than the threshold value, thus making the determination signal DET0 low. As a result, a squelch operation is not carried out. Conversely, when the level of the interference waves is large, the determination unit 13 makes its determination signal DET2 high to turn OFF the switching unit 12 or put the switching unit 12 in an attenuation state. Therefore, even in this case, the level of the output signal S4 of the combining unit 3 is dependent upon approximately only the level of the normal waves, so that the level of the AGC signal S6 of the AGC unit 4 is higher than the threshold value, thus making the determination signal SET0 low. As a result, a squelch operation is not carried out.

When interference waves are introduced into both of the receiving antenna units A1 and A2, both of the switching units 10 and 12 are turned OFF or put in an attenuation state by the determination signals DET1 and DET2. In this case, in order to carry out a squelch operation, a squelch unit 9' is provided instead of the squelch unit 9. That is, when both of the switching units 10 and 12 are turned OFF or put in an attenuation state, the level of the output signal S4 of the combining unit 3 becomes extremely low, so that the AGC signal S6 of the AGC unit 4 becomes extremely high. This extremely high level of the AGC signal S6 is detected by the squelch unit 9' to make the determination signal DET0 high, thus carrying out a squelch operation.

The modification of the determination units 11 (13) of FIG. 8 will be explained next with reference to FIGS. 10 and 11.

Figure 10:
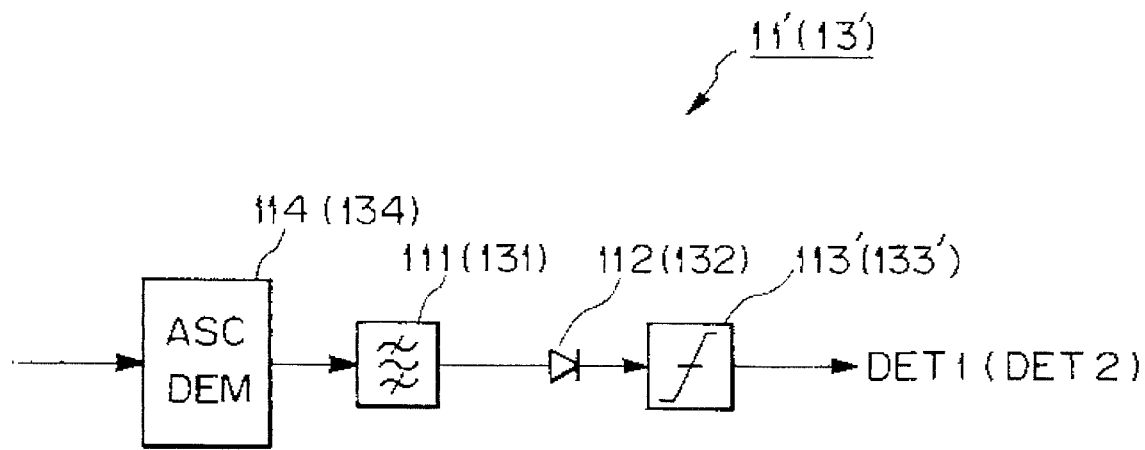
FIGS. 10 and 11 are circuit diagrams of modifications of the determination unit of FIG. 8.

In a determination unit 11' (13') FIG. 10, an analog service channel (ASC) demodulator 114 (134) is added to the elements of the determination units 11 (13) of FIG. 8, and a comparator 113' (133') is provided instead of the comparator 113 (133) of FIG. 6. In this case, assume that the receiving antenna units A1 and A2 receives a digital multi-valued modulation signal having a PSK modulated carrier by an N-bit identification signal. This modulation signal is demodulated by the ASC demodulator 114 (134). Then, the level of the identification signal is extracted by the band pass filter 111 (131) and the level detector 112 (132). Then, the comparator 113' (133') determines whether or not the level of the identification signal is lower than a threshold value. If the level of the identification signal is lower than the threshold value, the determination signal DET1 (DET2) is made high to turn OFF the switching unit 10 (12) or put the switching unit 10 (12) in an attenuation state.

Figure 11:
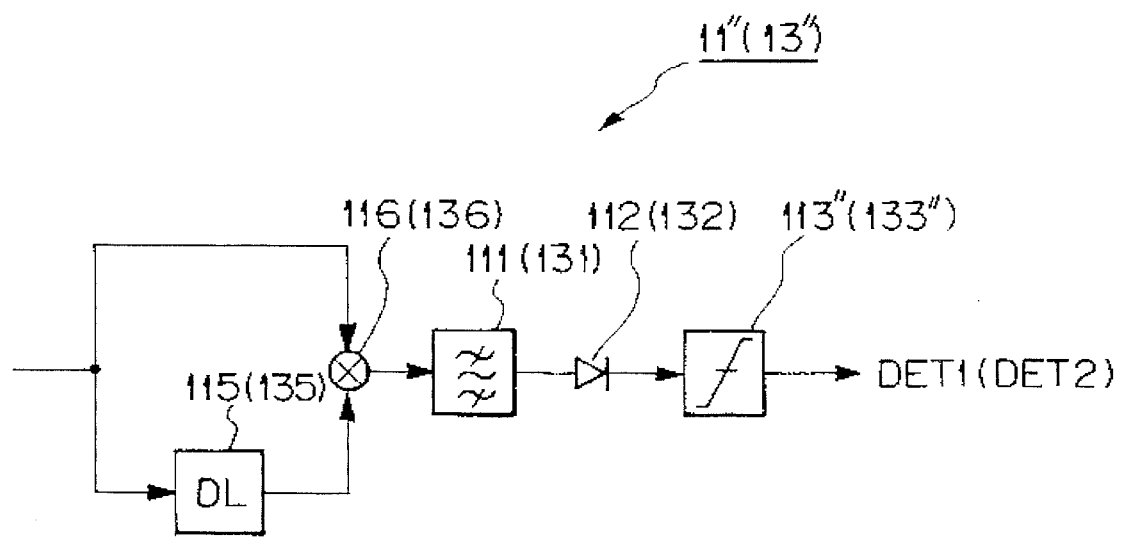

In a determination unit 11' (13') FIG. 11, a delay circuit 115 (135) and a multiplier 116 (136) are added to the elements of the determination units 11 (13) of FIG. 8, and a comparator 113" (133") is provided instead of the comparator 113 (133) of FIG. 8. In this case, assume that the receiving antenna units A1 and A2 receive a digital modulation signal including a clock signal. This modulation signal is demodulated by the delay circuit 115 (135) and the multiplier 116 (136). That is, if an input FM signal is represented by $$\hat{R}(kt)=P(kt)+jQ(kt)$$

where $P(kt)$ is a P-channel digital signal sequence and $Q(kt)$ is a Q-channel digital signal sequence. However, the digital FM signal is actually supplied to a low pass filter for an IF modulation (PSK or QAM modulation), and therefore, the digital FM signal becomes an analog signal, i.e., a so-called eye pattern signal. Therefore, the IF modulation signal can be represented by $$\hat{R}(t) \sin(\omega t)$$

then, an output signal of the multiplier 116 (136) is $$\hat{R}(t)\sin\omega t \cdot \hat{R}(t)\sin(\omega t + \phi) = \tfrac{1}{2}|\hat{R}(t)|^2 \cos\phi + \tfrac{1}{2}|\hat{R}(t)|^2 \cos(2\omega t + \phi)$$

where $\phi$ is an angular frequency of the carrier signal; and
$\phi$ is a delay phase of the delay circuit 115 (135). Therefore, by using the first term, which has a width centered at the clock signal frequency, the level of the clock signal is extracted by the band pass filter 111 (131) and the level detector 112 (132). Then, the comparator 113" (133") determines whether or not the level of the identification signal is higher than a threshold value. If the level of the clock signal is higher than the threshold value the determination signal DET1 (DET2) is made high to turn OFF the switching unit 10 (12) or put the switching unit 10 (12) in an attenuation state. Note that in the case of FM waves, the FM waves do not include such a clock signal.

Figure 12:
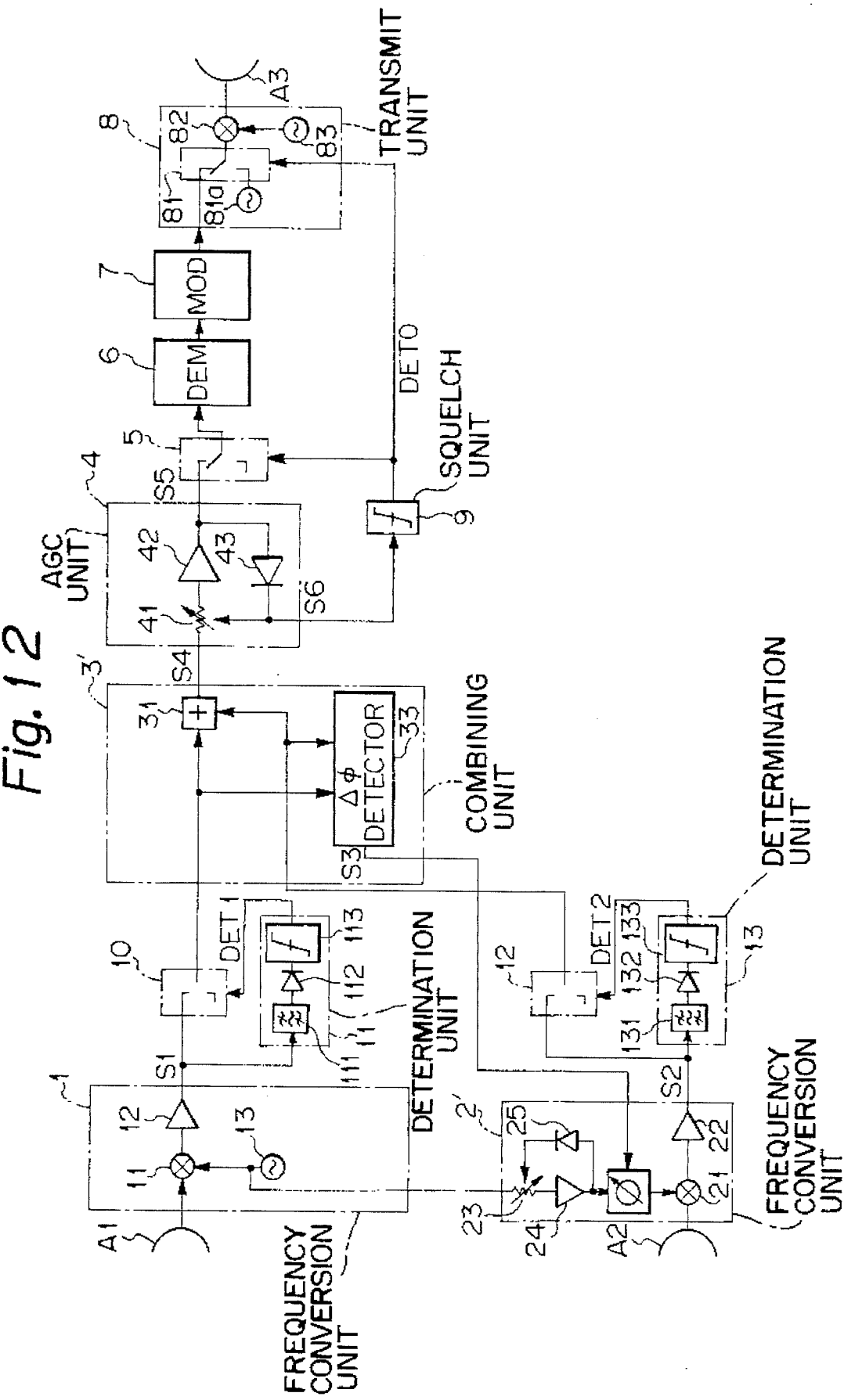
FIG. 12 is a circuit diagram illustrating a second embodiment of the combining diversity apparatus with a squelch function.

In FIG. 12, which illustrates a second embodiment of the present invention, the frequency conversion unit 2 and the combining unit 3 are modified into a frequency conversion unit 2' and a combining unit 3'. That is, the endless phase shifter 32 of FIG. 8 is replaced by an endless phase shifter 32' provided in the frequency conversion unit 2. In this case, the phase of the IF signal S2 per se is controlled directly by the phase difference detector 33. The squelch unit 9 and the determination units 11 and 13 are operated in the same way as in FIG. 8.

Figure 13:
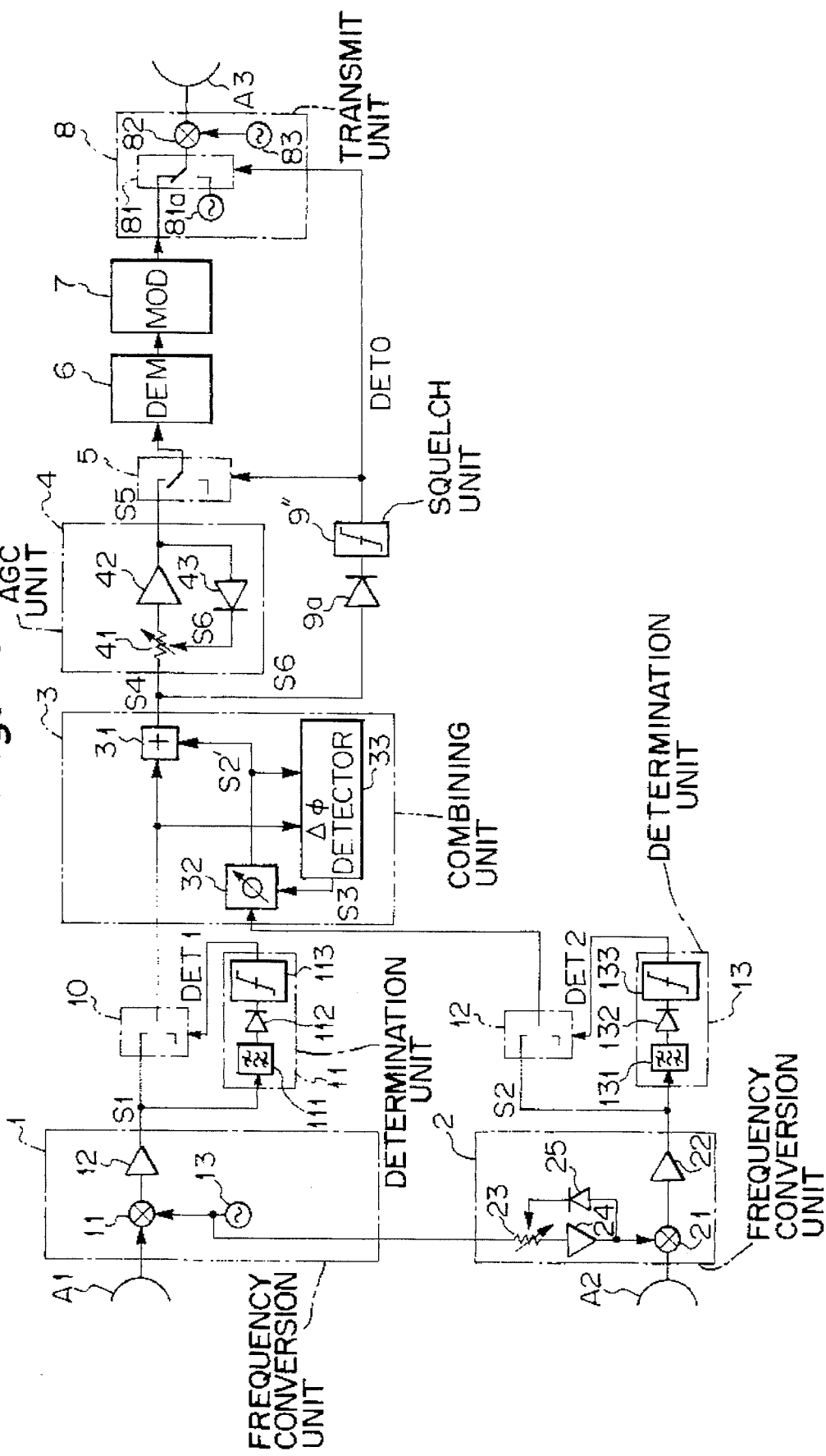
FIG. 13 is a circuit diagram illustrating a third embodiment of the combining diversity apparatus with a squelch function.

In FIG. 13, which illustrates a third embodiment of the present invention, a squelch unit 9" associated with a level detector 9a is connected to the combining unit 3. That is, when both of the switching units 10 and 12 are turned OFF or put in an attenuation state, the level of the output signal S4 of the combining unit 3 becomes extremely low. This extremely low level of the output signal S4 of the combining unit 3 is detected by the squelch unit 9" to make the determination signal DET0 high, thus carrying out a squelch operation.

In FIG. 14, which illustrates a fourth embodiment of the present invention, the demodulator 6 and the modulator 7 of FIG. 8 are not provided, and therefore, the switching unit 5 is connected directly to the transmitter unit 8. In this case, the combining diversity apparatus of FIG. 14 serves as a non-regenerative repeater.

In the above-described embodiments, two receiving antenna units are provided, however, the present invention can be applied to a combining diversity apparatus having three or more receiving antenna units having a space diversity relationship.

As explained hereinbefore, according to the present invention, even when undesired waves (interference waves) are introduced into a part of receiving antenna units, a squelch operation is not carried out, so that a combining operation is carried out normally.

I claim:

1. A combining diversity apparatus for a digital multi-valued modulation RF signal, comprising:

at least first and second receiving antenna units, having a space diversity relationship, for receiving the RF signal;

a first frequency conversion unit, connected to said first receiving antenna unit, for converting the RF signal into a first IF signal;

a second frequency conversion unit, connected to said second receiving antenna unit, for converting the RF signal into a second IF signal;

a first switching unit connected to said first frequency conversion unit;

a second switching unit connected to said second frequency conversion unit;

a first determination unit, connected to said first frequency conversion unit and said first switching unit, for determining whether or not a frequency component of the first IF signal is deviated from a first threshold value, to generate a first determination signal and transmit it to said first switching unit, so that said first switching circuit is turned OFF or put in an attenuation state;

a second determination unit, connected to said second frequency conversion unit and said second switching unit, for determining whether or not a frequency component of the second IF signal is deviated from a second threshold value, to generate a second determination signal and transmit it to said second switching unit, so that said second switching circuit is turned OFF or put in an attenuation state;

a combining unit, connected to said first and second switching units, for phasing-combining the first IF signal with the second IF signal to generate a combined signal;

a transmitter antenna;

a transmitter unit, connected to said combining unit and said transmitter antenna, for transmitting an output of said combining unit to said transmitter antenna; and a squelch unit, connected to said combining unit and said transmitter unit, for determining whether or not an output signal level of said combining unit is deviated from a third threshold value, to perform a squelch operation upon said transmitter unit when the output signal level of said combining unit is deviated from the third threshold value.

2. An apparatus as set forth in claim 1, wherein said first determination unit comprises:

a first band pass filter for passing a center frequency component of the first IF signal therethrough;

a first detector, connected to said first band pass filter, for detecting a level of the center frequency component of the first IF signal; and a first comparator, connected to said first detector, for determining whether or not the level of the center frequency component of the first IF signal is higher than the first threshold value, to generate the first determination signal, said second determination unit comprising:

a second band pass filter for passing a center frequency component of the second IF signal therethrough;

a second detector, connected to said second band pass filter, for detecting a level of the center frequency component of the second IF signal; and a second comparator, connected to said detector, for determining whether or not the level of the center frequency component of the second IF signal is higher than the second threshold value, to generate the second determination signal.

3. An apparatus as set forth in claim 1, wherein the RF signal includes an identification signal component, said first determination unit comprising:

a first demodulator for demodulating the identification signal component of the first IF signal;

a first band pass filter for passing a the identification signal component of the first IF signal therethrough;

a first detector, connected to said first band pass filter, for detecting a level of the identification signal component of the first IF signal; and a first comparator, connected to said first detector, for determining whether or not the level of the identification signal component of the first IF signal is lower than the first threshold value, to generate the first determination signal, said second determination unit comprising:

a second demodulator for demodulating the identification signal component of the second IF signal;

a second band pass filter for passing the identification signal component of the second IF signal therethrough;

a second detector, connected to said second band pass filter, for detecting a level of the identification signal component of the second IF signal; and a second comparator, connected to said second detector, for determining whether or not the level of the identification signal component of the second IF signal is lower than the second threshold value, to generate the second determination signal.

4. An apparatus as set forth in claim 1, wherein each of said first and second determination units comprises a clock extracting circuit for extracting a clock signal component of one of the first and second IF signals, to generate the first and second determination signals, respectively, in accordance with a level of the clock signal component.

5. An apparatus as set forth in claim 1, wherein said first determination unit comprises:

a first delay circuit, connected to said first frequency conversion unit, for delaying the first IF signal by a first definite time period;

a first multiplier, connected to said first frequency convension unit and said first delay circuit, for multiplying the first IF signal by a delayed first IF signal of said first delay circuit;

a first band pass filter, connected to said first multiplier, for passing a clock frequency component of an output signal of said first multiplier therethrough;

first detector, connected to said first band pass filter, for detecting a level of the clock frequency component of the output signal of said first multiplier; and a first comparator, connected to said first detector, for determining whether or not the level of the clock frequency component of the output signal of said first multiplier is higher than the first threshold value, to generate the first determination signal, said second determination unit comprising:

a second delay circuit, connected to said second frequency conversion unit, for delaying the second IF signal by a second definite time period;

a second multiplier, connected to said second frequency convension unit and said second delay circuit, for multiplying the second IF signal by a delayed second IF signal of said second delay circuit;

a second band pass filter, connected said second multiplier, for passing a clock frequency component of an output signal of said second multiplier therethrough;

a second detector, connected to said second band pass filter, for detecting a level of the clock frequency component of the output signal of said second multiplier; and a second comparator, connected to said second detector, for determining whether or not the level of the clock frequency component of the output signal of said second multiplier is lower than the second threshold value, to generate the second determination signal.

6. An apparatus as set forth in claim 1, further comprising an AGC unit, connected between said combining unit and said transmitter unit.

7. An apparatus as set forth in claim 1, further comprising:

a demodulation unit connected to said combining unit; and a modulation unit connected between said demodulation unit and said transmitter unit.

8. An apparatus as set forth in claim 1, wherein said combining unit comprises:

a phase shifter, connected to said second switching unit, for shifting a phase of the second IF signal to make it conform to the phase of the first IF signal;

a phase difference detector, connected to said first switching unit and said phase shifter, for detecting a phase difference between the first IF signal and an output signal of said phase shifter; and an adder, connected to said first switching unit and to said phase shifter, for adding an output signal of said first switching unit to the output signal of said phase shifter.

9. An apparatus as set forth in claim 1, wherein each of said first and second frequency conversion units comprises:

a local oscillation circuit connected to one of said first and second receiving antenna units;

a mixing circuit, connected to the one of said first and second receiving antenna units, for mixing the RF signal with an output signal of said local oscillation circuit, said combining unit comprising:

a phase shifter, connected to said second switching unit, for shifting a phase of the second IF signal to make it conform to the phase of the first IF signal;

a phase difference detector, connected to said first and second switching units and to one of said first and second frequency conversion units, for detecting a phase in difference between the first and second IF signals to shift a phase of one of the first and second IF signals to make it conform to the phase of the other; and an adder, connected to the other of said first and second switching units for adding an output signal of the one of said first and second switching units to an output signal of the other.

10. An apparatus as set forth in claim 1, wherein said first frequency conversion unit comprises:

a local oscillation circuit; and a first mixing circuit, connected to said local oscillation circuit and said receiving antenna unit, for mixing the RF signal with an output signal of said first local oscillation circuit to generate the first IF signal;

said second frequency conversion unit comprising:

a phase shifter, connected to said local oscillator, for shifting a phase of an output signal of said local oscillator; and a second mixing circuit, connected to said phase shifter and said second receiving antenna unit, for mixing the RF signal with an output signal of said phase shifter to generate the second IF signal;

said combining unit comprising:

a phase difference detector, connected to said first and second switching units and to said phase shifter, for detecting a phase in difference between the first IF signal and the second IF signal and transmitting the phase difference to said phase shifter so as to make the phase of the first IF signal conform to the phase of the second IF signal; and an adder, connected to said first and second switching units, for adding an output signal of said first switching unit to an output signal of said second switching unit.

11. A combining diversity apparatus for a digital multi-valued modulation RF signal, comprising:

at least first and second receiving antenna units, having a space diversity relationship, for receiving the RF signal;

a first frequency conversion unit, connected to said first receiving antenna unit, for converting the RF signal into a first IF signal;

a second frequency conversion unit, connected to said second receiving antenna unit, for converting the RF signal into a second IF signal;

a first switching unit connected to said first frequency conversion unit;

a second switching unit connected to said second frequency conversion unit;

a first determination unit, connected to said first frequency conversion unit and said first switching unit, for determining whether or not a frequency component of the first IF signal is deviated from a first threshold value, to generate a first determination signal and transmit it to said first switching unit, so that said first switching circuit is turned OFF or put in an attenuation state;

a second determination unit, connected to said second frequency conversion unit and said second switching unit, for determining whether or not a frequency component of the second IF signal is deviated from a second threshold value, to generate a second determination signal and transmit it to said switching unit, so that said second switching circuit is turned OFF or put in an attenuation state;

a combining unit, connected to said first and second switching units, for phasing-combining the first IF signal with the second IF signal to generate a combined signal;

a squelch unit, connected to said combining unit, for determining whether or not an output signal level of said combining unit is deviated from a third threshold value, to perform a squelch operation upon the combined signal when the output signal level of said combining unit is deviated from the third threshold value.

12. A combining diversity apparatus for a digital multi-valued modulation RF signal, comprising:

at least first and second receiving antenna units, having a space diversity relationship, for receiving the RF signal;

a first frequency conversion unit, connected to said first receiving antenna unit, for converting the RF signal into a first IF signal;

a second frequency conversion unit, connected to said second receiving antenna unit, for converting the RF signal into a second IF signal;

a first switching unit connected to said first frequency conversion unit;

a second switching unit connected to said second frequency conversion unit;

a first determination unit, connected to said first frequency conversion unit and said first switching unit, for determining whether or not a frequency component of the first IF signal is deviated from a first threshold value, to generate a first determination signal and transmit it to said first switching unit, so that said first switching circuit is turned OFF or put in an attenuation state;

a second determination unit, connected to said second frequency conversion unit and said second switching unit, for determining whether or not a frequency component of the second IF signal is deviated from a second threshold value, to generate a second determination signal and transmit it to said second switching unit, so that said second switching circuit is turned OFF or put in an attenuation state;

a combining unit, connected to said first and second switching units, for phasing-combining the first IF signal with the second IF signal to generate a combined signal;

an AGC unit, connected to said combining unit, for performing an AGC operation upon the combined signal;

a transmitter antenna;

a transmitter unit, connected to said AGC unit and said transmitter antenna, for transmitting an output of said AGC unit to said transmitter antenna; and a squelch unit, connected to said AGC unit and said transmitter unit, for determining whether or not an AGC signal level of said AGC unit is deviated from a third threshold value, to perform a squelch operation upon said transmitter unit when the AGC signal level of said AGC unit is deviated from the third threshold level.

13. An apparatus as set forth in claim 12, wherein said first determination unit comprises:

a first band pass filter for passing a center frequency component of the first IF signal therethrough;

a first detector, connected to said first band pass filter, for detecting a level of the center frequency component of the first IF signal; and a first comparator, connected to said first detector, for comparing the level of the center frequency component of the first IF signal is higher than the first threshold value, to generate the first determination signal, said second determination unit comprising:

a second band pass filter for passing a center frequency component of the second IF signal therethrough;

a second detector, connected to said second band pass filter, for detecting a level of the center frequency component of the second IF signal; and a second comparator, connected to said detector, for determining whether or not the level of the center frequency component of the second IF signal is higher than the second threshold value, to generate the second determination signal.

14. An apparatus as set forth in claim 12, wherein the RF signal includes an identification signal component, said first determination unit comprising:

a first demodulator for demodulating the identification signal component of the first IF signal;

a first band pass filter for passing the identification signal component of the first IF signal therethrough;

a first detector, connected to said first band pass filter, for detecting a level of the identification signal component of the first IF signal; and a first comparator, connected to said first detector, for determining whether or not the level of the identification signal component of the first IF signal is lower than the first threshold value, to generate the first determination signal, said second determination unit comprising:

a second demodulator for demodulating the identification signal component of the second IF signal;

a second band pass filter for passing the identification signal component of the second IF signal therethrough;

a second detector, connected to said second band pass filter for detecting a level of the identification signal component of the second IF signal; and a second comparator, connected to said second detector, for determining whether or not the level of the identification signal component of the second IF signal is lower than the second threshold value to generate the second determination signal.

15. An apparatus as set forth in claim 12, wherein each of said first and second determination units comprises a clock extracting circuit for extracting a clock signal component of one of the first and second IF signals, to generate the first and second determination signals, respectively, in accordance with a level of the clock signal component.

16. An apparatus as set forth in claim 12, wherein said first determination unit comprises:

a first delay circuit, connected to said first frequency conversion unit, for delaying the first IF signal by a first definite time period;

a first multiplier, connected to said first frequency convension unit and said first delay circuit, for multiplying the first IF signal by a delayed first IF signal of said first delay circuit;

a first band pass filter, connected to said first multiplier for passing a clock frequency component of an output signal of said first multiplier therethrough;

a first detector, connected to said first band pass filter, for detecting a level of the clock frequency component of the output signal of said first multiplier; and a first comparator, connected to said first detector, for determining whether or not the level of the clock frequency component of the output signal of said first multiplier is lower than the first threshold value, to generate the first determination signal, said second determination unit comprising:

a second delay circuit, connected to said second frequency conversion unit, for delaying the second IF signal by a second definite time period;

a second multiplier, connected to said second frequency conversion unit and said second delay circuit, for multiplying the second IF signal by a delayed second IF signal of said second delay circuit;

a second band pass filter, connected to said second multiplier, for passing a clock frequency component of an output signal of said second multiplier therethrough;

a second detector, corrected to said second band pass filter, for detecting a level of the clock frequency component of the output signal of said second multiplier; and a second comparator, connected to said second detector, for determining whether or not the level of the clock frequency component of the output signal of said second multiplier is lower than the second threshold value, to generate the second determination signal.

17. An apparatus as set forth in claim 12, further comprising:

a demodulation unit connected to said AGC unit; and a modulation unit connected between said demodulation unit and said transmitter unit.

18. An apparatus as set forth in claim 12, wherein said combining unit comprises:

a phase shifter, connected to said second switching unit detector, for shifting a phase of the second IF signal to conform it to a phase of the first IF signal;

a phase difference detector, connected to said first switching unit and said phase shifter, for detecting a phase difference between the first IF signal and an output signal of said phase shifter; and an adder, connected to said first switching unit and to said phase shifter, for adding an output signal of said first switching unit to the output signal of said phase shifter.

19. An apparatus as set forth in claim 12, wherein said first frequency conversion unit comprises:

a local oscillation circuit; and a first mixing circuit, connected to said local oscillation circuit and said receiving antenna unit, for mixing the RF signal with an output signal of said first local oscillation circuit to generate the first IF signal;

said second frequency conversion unit comprising:

a phase shifter, connected to said local oscillator, for shifting a phase of an output signal of said local oscillator; and a second mixing circuit, connected to said phase shifter and said second receiving antenna unit, for mixing the RF signal with an output signal of said phase shifter to generate the second IF signal;

said combining unit comprising:

a phase difference detector, connected to said first and second switching units and to said phase shifter, for detecting a phase in difference between the first IF signal and the second IF signal and transmitting the phase difference to said phase shifter so as to make the phase of the first IF signal conform to the phase of the second IF signal; and an adder, connected to said first and second switching units, for adding an output signal of said first switching unit to an output signal of said second switching unit.

20. A combining diversity apparatus for a digital multi-valued modulation RF signal, comprising:

at least first and second receiving antenna units, having a space diversity relationship, for receiving the RF signal;

a first frequency conversion unit, connected to said first receiving antenna unit, for converting the RF signal into a first IF signal;

a second frequency conversion unit, connected to said second receiving antenna unit, for converting the RF signal into a second IF signal;

a first switching unit connected to said first frequency conversion unit;

a second switching unit connected to said second frequency conversion unit;

a first determination unit, connected to said first frequency conversion unit and said first switching unit, for determining whether or not a frequency component of the first IF signal is deviated from a first threshold value, to generate a first determination signal and transmit it to said first switching unit, so that said first switching circuit is turned OFF or put in an attenuation state;

a second determination unit, connected to said second frequency conversion unit and said second switching unit, for determining whether or not a frequency component of the second IF signal is deviated from a second threshold value, to generate a second determination signal and transmit it to said second switching unit, so that said second switching circuit is turned OFF or put in an attenuation state;

a combining unit, connected to said first and second switching units, for phasing-combining the first IF signal with the second IF signal to generate a combined signal;

an AGC unit, connected to said combining unit, for performing an AGC operation upon the combined signal; and a squelch unit, connected to said AGC unit, for determining whether or not an AGC signal level of said AGC unit is deviated from a third threshold value, to perform a squelch operation upon the combined signal when the AGC signal level of said AGC unit is deviated from the third threshold value.

* * * * *